US005909830A

United States Patent [19]

Bates et al.

[11] Patent Number: 5,909,830

[45] Date of Patent: Jun. 8, 1999

[54] ELECTRICALLY OPERATED MATERIAL DISPENSING GUN AND METHOD

[75] Inventors: Darryle E. Bates, Stow; Scott S. Kalanish, Hiram, both of Ohio

[73] Assignee: Essex Specialty Products, Inc., Auburn Hills, Mich.

[21] Appl. No.: 08/803,220

[22] Filed: Feb. 20, 1997

Related U.S. Application Data

[63] Continuation-in-part of application No. 08/663,320, filed as application No. PCT/WO96/34696, May 3, 1996, Pat. No. 5,775,539, which is a continuation-in-part of application No. 08/435,343, May 5, 1995, abandoned.

[51] Int. Cl.$^{6}$ .................... G01F 11/00

[52] U.S. Cl. .................... 222/327; 222/333; 222/391

[58] Field of Search .................... 222/1, 326, 327, 222/333, 391

[56] References Cited

U.S. PATENT DOCUMENTS

| | | | |
|---|---|---|---|
| D. 258,797 | 4/1981 | Davis, Jr. | D8/14.1 |
| 3,861,567 | 1/1975 | Davis, Jr. | 222/333 |
| 4,024,994 | 5/1977 | Davis, Jr. | 222/326 |
| 4,171,072 | 10/1979 | Davis, Jr. | 222/326 |
| 4,180,187 | 12/1979 | Ben-Haim | 222/326 |
| 4,249,677 | 2/1981 | Davis, Jr. | 222/326 |
| 4,264,021 | 4/1981 | Davis, Jr. | 222/326 |
| 4,273,269 | 6/1981 | Davis, Jr. | 222/326 |
| 4,322,022 | 3/1982 | Bergman | 222/327 |
| 4,583,934 | 4/1986 | Hata et al. | 425/376 R |
| 4,615,469 | 10/1986 | Kishi et al. | 222/327 |
| 4,669,636 | 6/1987 | Miyata | 222/153 |
| 5,027,984 | 7/1991 | Gakhar et al. | 222/326 |
| 5,058,781 | 10/1991 | Aronie et al. | 222/326 |
| 5,188,259 | 2/1993 | Petit | 222/63 |
| 5,323,931 | 6/1994 | Robards, Jr. et al. | 222/96 |
| 5,341,958 | 8/1994 | Bayat et al. | 222/63 |

FOREIGN PATENT DOCUMENTS

| | | |
|---|---|---|
| 1118729 | 2/1982 | Canada . |
| 3418052 | 12/1984 | Germany . |
| 3428202 | 2/1985 | Germany . |

*Primary Examiner*—Joseph A. Kaufman

*Attorney, Agent, or Firm*—Watts, Hoffman, Fisher & Heinke Co., L.P.A.

[57] ABSTRACT

An electrically actuated material dispensing gun is disclosed having a body including a handle section and an elongate cartridge support section extending outwardly from the handle section. The cartridge support section includes a cartridge support space and an apertured end wall for receiving a cartridge dispensing nozzle and for dispensing force resisting engagement with a dispensing end of a cartridge positioned in the space. A reciprocatable push rod is carried by the handle section and axially aligned with the space for force transmitting engagement with a piston which in one embodiment is of unique construction. An electric motor is mounted in the handle section. A drive element is rotatively mounted in the handle section and in positive drive, mechanically interconnected, relationship with the rod. The drive element is normally freely rotatable in response to axial motion of the rod. A power train including a multi-stage planetary axially aligned with and connected to the output shaft of the motor. In one embodiment a drive transmission clutch is provided for automatically interconnecting the drive element and the power train and for transmission of driving forces when so interconnected and when the output shaft is rotated in response to motor energization. In another embodiment a manually actuated plunger selectively completes the drive train. A trigger is carried by the handle section and is operably connected to an on/off switch selectively to complete a motor energization circuit.

37 Claims, 5 Drawing Sheets

ELECTRICALLY OPERATED MATERIAL DISPENSING GUN AND METHOD

This application is a continuation-in-part of application Ser. No. 08/663,320, now U.S. Pat. No. 5,775,539, filed Jun. 20, 1996 based on PCT Application WO96/34696 filed May 3, 1996 claiming priority from, and as a continuation-in-part of, application Ser. No. 08/435,343, filed May 5, 1995, now abandoned, both prior applications being entitled Electrically Operated Material Dispensing Gun and Method.

TECHNICAL FIELD

This invention relates to viscous material dispensers and more particular to a material dispensing gun adapted to receive a disposal tube of viscous material and having a battery operated electric motor as a power source for dispensing the material.

BACKGROUND

The use of disposable cartridges of caulking material is not only now well established but has become the near universal system for the dispensing of caulking compounds, various sealants and other viscous materials. While hand actuated caulking guns are well known and well established, for a variety of reasons there is a growing demand for powered caulking guns.

Professionals, such as those employed in the construction trade, can suffer excessive fatigue from performing tasks such as applying adhesives to joists and studs when sheet flooring or wall boards are being installed. The fatigue problem is exacerbated when material is being dispensed in a cold environment because the viscosity of the material increases and higher dispensing forces are required. Indeed, the use of hand actuated caulking guns for such tasks can result in injuries such as carpal tunnel syndrome.

Automobile windshields represent another reason there is a demand for power assisted caulking guns. With many current automotive designs, the windshields have become structural parts of automobiles. In order for a windshield to function as a structural part, a windshield is securely bonded to a surrounding metal frame. The adhesive materials used for this windshield bonding, especially for replacement windshields, have high viscosity, and dispensing such an adhesive material from a cartridge requires extremely high dispensing forces. As a consequence, the installation of such windshields requires a material dispensing gun with which significant force is applied to the material to cause its dispensing.

Air actuated caulking guns which utilize compressed air are known. One commercially successful air actuated gun is described in U.S. Pat. No. 5,181,636 issued Jan. 26, 1993 under the title Incremental Dispensing Device and assigned to the assignee of this patent. Most notably the embodiment shown in FIGS. 4 through 7 of that patent has enjoyed good success in such applications as the dispensing of adhesives on joists for securement of subflooring. While this air actuated gun has enjoyed success, attempts to provide truly portable battery powered caulking guns have enjoyed only limited success.

With most caulking guns, a rod or equivalent dispensing mechanism engages a piston of a caulking tube cartridge and drives the piston toward the outlet to expel viscous material from the cartridge. Once the material in a cartridge has been expended, it is desirable for the operator to very quickly retract the dispensing mechanism to enable a spent cartridge to be removed from the gun and a new cartridge to be inserted in it. Another shortcoming of prior proposals for battery operated guns is that most, if not all, prior proposals and commercially available guns have not included a construction which provided truly simple and quick retraction of a dispensing mechanism.

Applications in which prior battery operated caulking guns could be utilized have been limited by the dispensing forces that could be generated. As an example, prior battery operated guns were not capable of generating sufficient force to dispense the sealants used to fix a replacement automotive windshield to its surrounding metal frame. Neither were they capable of dispensing construction adhesives in colder climates because even if capable of dispensing such adhesives under cold conditions, flow rates were unacceptably slow. Another disadvantage of prior battery operated dispensers has been that the power requirements were excessively high. The result has been that the number of tubes of material that could be dispensed in a battery discharge cycle was unacceptably low.

A number of proposals have utilized a threaded rod as the mechanism to transmit expelling force to a viscous material cartridge piston. With a number of these it has been proposed that the threaded rod be engaged by a split nut or claw. With these proposals a manually actuated member would be provided to shift the nut components between a rod engaged position for dispensing and a rod release position for rod retraction.

With another proposal a cam would drive an elongate washer which would frictionally engage a dispensing rod when dispensing force is applied to the washer by the cam. This proposal suggests provision of a manually operated release screw for selective release of the washer, referred to by a patentee as a “holding plate”, to allow manually retraction of the rod.

In another proposal, a toothed rod is provided which has a smooth surface over a large portion of its circumference. Drive and hold detents engage the rod teeth when the rod is being advanced. For retraction the rod is rotated until a smooth surface engages the detents to allow retraction.

With other proposals it has been necessary to have a reversible motor and to drive the motor in a reverse direction for drive mechanism retraction. Still another proposal would use a plug to expand an expansible threaded element into engagement with the drive gear when the tube is advanced and to release the tube from the gear for manual retraction. A further proposal utilized a rack release button which had to be depressed simultaneously with applying retractive force to the rack to achieve manual rack retraction.

A commercially available battery operated caulking gun utilizes collapsing racks to provide a relatively short gun. Retraction of the collapsing racks for replacing a spent cartridge with a fresh cartridge requires the application of a substantial manually applied pressure after a spent cartridge has been manually removed from the gun. To enable such removal, the cartridge holding portion of the gun includes a pivotal end cover. The cover is selectively positionable in an overlapping relationship with the end of a caulking tube in a use position and pivotal to a retract position to allow extraction of a spent tube from the gun. Thus, there is no provision for collapsing the racks relatively in preparation of the gun for receiving a new cartridge unless the spent cartridge is first removed. Accordingly, there is, as compared with other modern caulking guns, undue complexity for the cartridge retention function.

SUMMARY OF THE INVENTION

An electrically actuated caulking gun made in accordance with this invention includes a housing having a handle section and an elongate cartridge support section. The cartridge support section extends outwardly from the handle section and is adapted to receive and support a cartridge of viscous material to be dispensed. The cartridge typically has a nozzle which projects through an opening in an end wall of the support section such that the dispensing end of the cartridge engages the wall to resist dispensing forces applied to a piston within the cartridge.

An elongate dispensing rod extends through the handle section and extends axially into the cartridge section. The rod has rack teeth formed in it. A rack pinion gear is rotatively mounted in the handle section in constantly meshing engagement with the rack teeth.

A downstream epiclycic or planetary gear train is provided which includes a set of planet gears engaging a surrounding externally notched ring gear. A carrier is connected to the planet gears to provide a planetary output. Constantly meshing gearing interconnects the rack pinion and the carrier.

An electric motor is mounted in the housing. The motor is connected to the planetary via a high reduction gear box. An output of the gear box is toothed. The teeth of the output serve as a sun gear to constantly engage the planet gears.

In the preferred embodiment, the high reduction gear box attached to the motor includes a three stage planetary axially aligned gear train with and connected to an output shaft of the motor. The three stage planetary includes a single, rotatively fixed ring gear. The planetary gear train downstream from the gear box is a two stage planetary axially aligned with and connected to the gear box. The downstream planetary includes a ring gear which is rotatably mounted. Thus, together there are five axially aligned planetary stages which provide the requisite speed reduction utilizing gearing having the strength to withstand forces applied to the caulking material in excess of 2,000 pounds per square inch while providing a compact package which fits neatly within the confines of a hand operated electrically driven dispensing gun.

Compact packaging and overall balance are achieved by positioning the motor and gear train with their common axis parallel to the dispensing rod or rack. This parallel relationship is achieved by interconnecting the gear train output with the rack pinion with a pair of bevel gears having perpendicular axes of rotation.

A trigger is pivotally mounted in the handle section. On manual shifting of the trigger from a normal to an actuating position, an on/off, variable speed switch is actuated. Actuation of the switch closes a motor energizing circuit connecting the output of a handle section supported battery with the motor. Ideally the switch is of the now well known type which provides variable speed motor operation. The use of variable speed enables very precise operator control of viscous material dispensing rates.

In one embodiment, the trigger is linkage connected to a pawl. Movement of the trigger, causing energization of the motor, concurrently shifts the pawl into engagement with the ring gear of the downstream planetary. When the pawl becomes aligned with one of the downstream ring gear notches, as a consequence of pawl engagement with the ring gear and ring gear rotation, the pawl is biased into the aligned notch to arrest the ring gear rotation. Arresting of the ring gear rotation causes the planet gears to orbit, rather than simply rotate about their own axes, and drive the output carrier to in turn drive the rack. As the rack is driven toward the end wall of the cartridge support section, pressure is applied to a cartridge piston to expel viscous material through the cartridge nozzle.

One of the outstanding features of the thus far described embodiment of the invention is that at times other than when the motor is energized and the pawl engages the ring gear to stop its rotation, the rack is freely moveable. The rack is freely moveable because the ring gear of the downstream planetary is free to rotate relative to the motor, the gear box and the sun gear. Thus, if the rack is moved rearwardly away from the cartridge support end wall, whether it be by manual retraction force or in response to pressure from air entrained in the viscous material expanding at the conclusion of the application of material dispensing force and, since the downstream ring gear is free to rotate, the planetary train and carrier rotate freely without rotation of components of either the motor or the high reduction gear box.

Where exceptionally viscous materials are to be dispensed, a modified downstream ring gear and a spring biased plunger are provided for enhanced strength in selectively establishing force transmission control of connections between the downstream planetary and the rack. A manually operated over center plunger positioner is provided to selectively fix the plunger in a release position or permit the plunger to be spring biased into engagement with the modified ring gear.

Among other advantages free rack movement of a rod having an external handle projection is it enables quick exchange of an unused cartridge of material for a spent cartridge. This feature is especially advantageous if the operator is placing a partially spent cartridge in the gun because it is not necessary to drive the dispensing mechanism slowly forward with the motor.

Another advantage of the provision of a freely moveable rack is that not only can the dispensing mechanism be retracted quickly, it is done manually. In the case of the pawl embodiment, this permits the use of a relatively inexpensive unidirectional motor circuit rather than a more expensive reversible motor circuit.

A novel piston provides exceptionally efficient dispensing when the material to be dispensed is in a bag like container.

Accordingly, the objects of the invention are to provide a novel and improved electrically actuated viscous material dispenser and a method of dispensing viscous material.

DETAILED DESCRIPTION OF PREFERRED EMBODIMENTS

Figures 1, 1A:
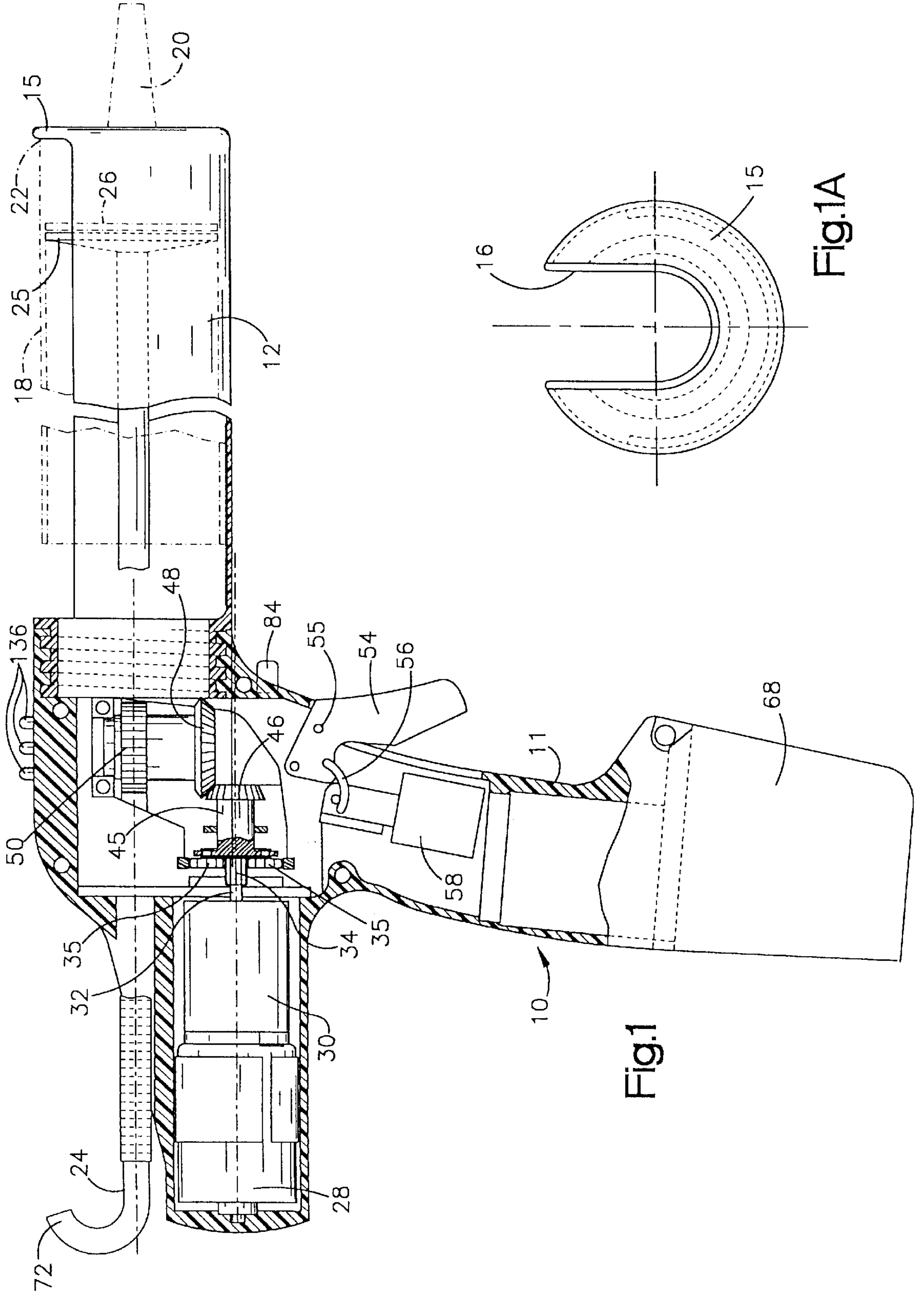
FIG. 1 is a sectional view of the caulking gun of this invention with the cartridge support section foreshortened for clarity of illustration.
FIG. 1A is an end elevational view of the cartridge support section end wall.
Figure 8:
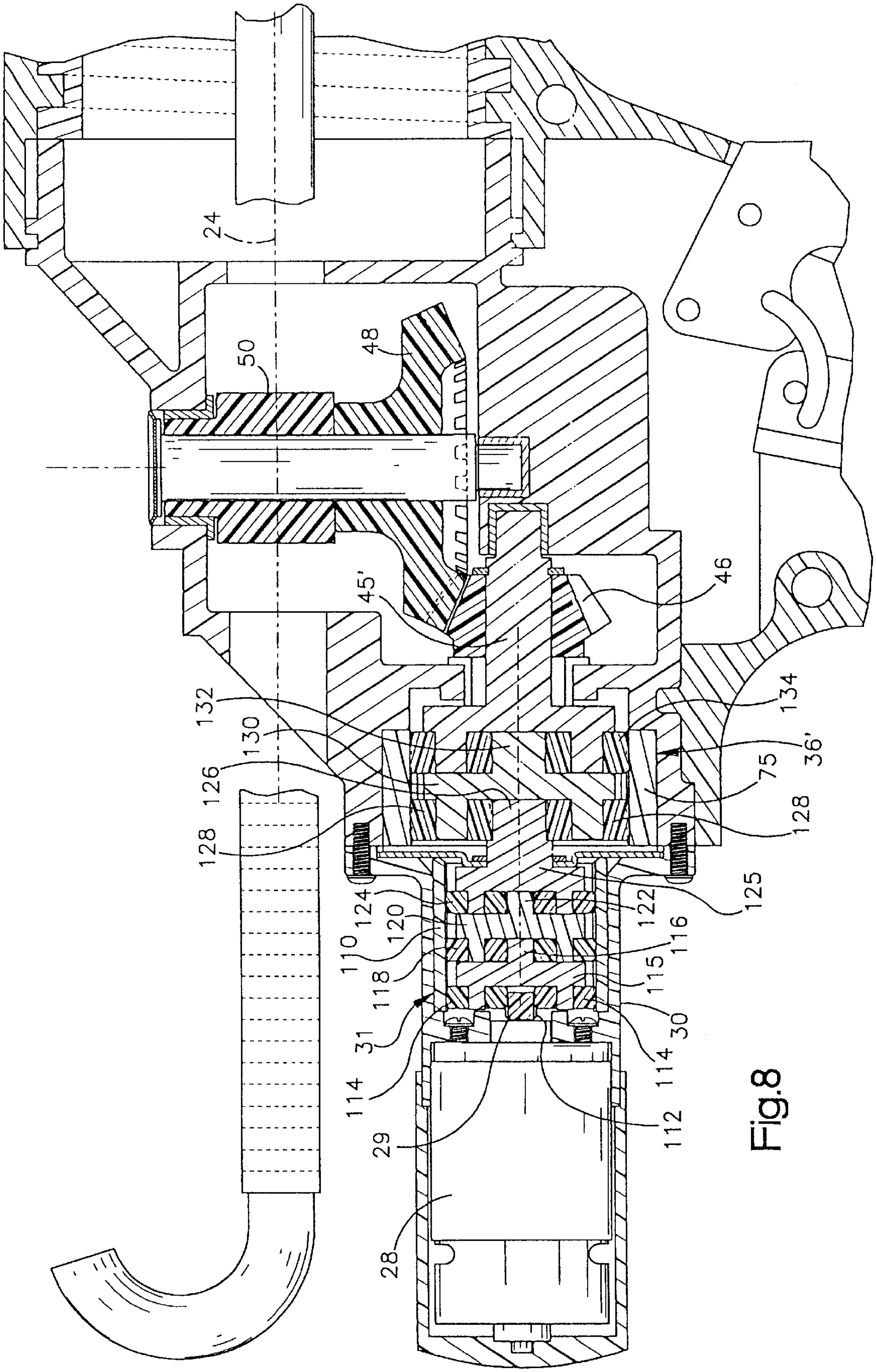

Referring now to the drawings and to FIGS. 1 and 8 in particular, an electrically actuated caulking gun is shown generally at 10. The drawings are somewhat schematic for clarity of illustration. The gun 10 includes a housing having a handle section 11 and a threadedly connected cartridge support section 12. In FIG. 1, the illustrated cartridge support section includes an end wall 15 having a nozzle receiving slot 16. Alternatively, a threadably removable support section as is known in the art may be provided and indeed is preferred in some applications such as sausage dispensing and windshield repair.

Cartridges containing viscous material to be dispensed, one of which is shown in phantom at 18 in FIG. 1, are selectively positionable in a cartridge receiving space delineated by the support section 12. A typical cartridge 18 includes a nozzle 20 which projects through the slot 16 such that a forward end 22 of the cartridge abuts the end wall 15 to provide resistance against material dispensing applied forces.

An elongate rod 24 projects axially through an upper portion of the handle section 11 and into the cartridge receiving space in the support section 12. A pusher 25 is connected to the rod 24 at its forward or distal end for selective engagement with a cartridge piston 26.

An electric motor 28 is mounted within the handle section 11. The motor is in a rearward extension of the handle section. Preferably the motor is specially wound to operate under maximum load of the order of 2500 pounds of force at 85% to 90% of its no load speed. Such a motor is capable of producing up to eight times its intended maximum required force. Such a motor also avoids surges such as are exhibited by other guns when a trapped air pocket is reached. The specially wound motor also provides near constant dispensing speeds whether one is dispensing relatively low or highly viscous materials.

The Lower Force Embodiment

As is best shown in FIG. 8, a motor output shaft 29 is connected to gears 31 (FIG. 8) within a high reduction gear box 30. In the embodiment of FIGS. 1–4, an output shaft 32 of the gear box 30 carries a coaxial drive pinion or sun gear 34. The sun gear 34 is in constantly meshing engagement with a set of four planet gears 35 of a planetary train shown generally at 36. The planetary train 36 includes a ring gear 38 which surrounds and constantly engages the planet gears 35. The ring gear 38 of FIGS. 2–4 includes a plurality of external notches 40. The notches are selectively engageable by a pawl 42.

The planet gears 35 are respectively journaled on support shafts 44. The support shafts 44 are connected to a planet carrier and shaft which in turn is connected to a carrier 45, see FIG. 2. The carrier 45 includes a bevel gear 46 which constantly meshes a mating bevel gear 48. The bevel gear 48 drives a rod pinion 50. The rod pinion 50 is in constantly meshing engagement with rack teeth 52 formed in the rod 24.

A trigger 54 is carried by the handle section 11 via a pivot 55. An arm 56 is carried by the trigger. The arm 56 has an aperture which receives a control arm 57 of a variable speed control, switch 58. One suitable switch is supplied by Lucerne Products, Inc. of Hudson, Ohio utilizing the circuitry of its TSCRDC-2512 switch in a pivotal trigger ELM-2516-LBS switch. A trigger spring 60 biases the trigger 54 toward its normal or off position. Due to the control arm 57 of the switch 58 being within the aperture in the trigger arm 56, the spring 60 also biases the switch to a normally off condition.

Figure 2:
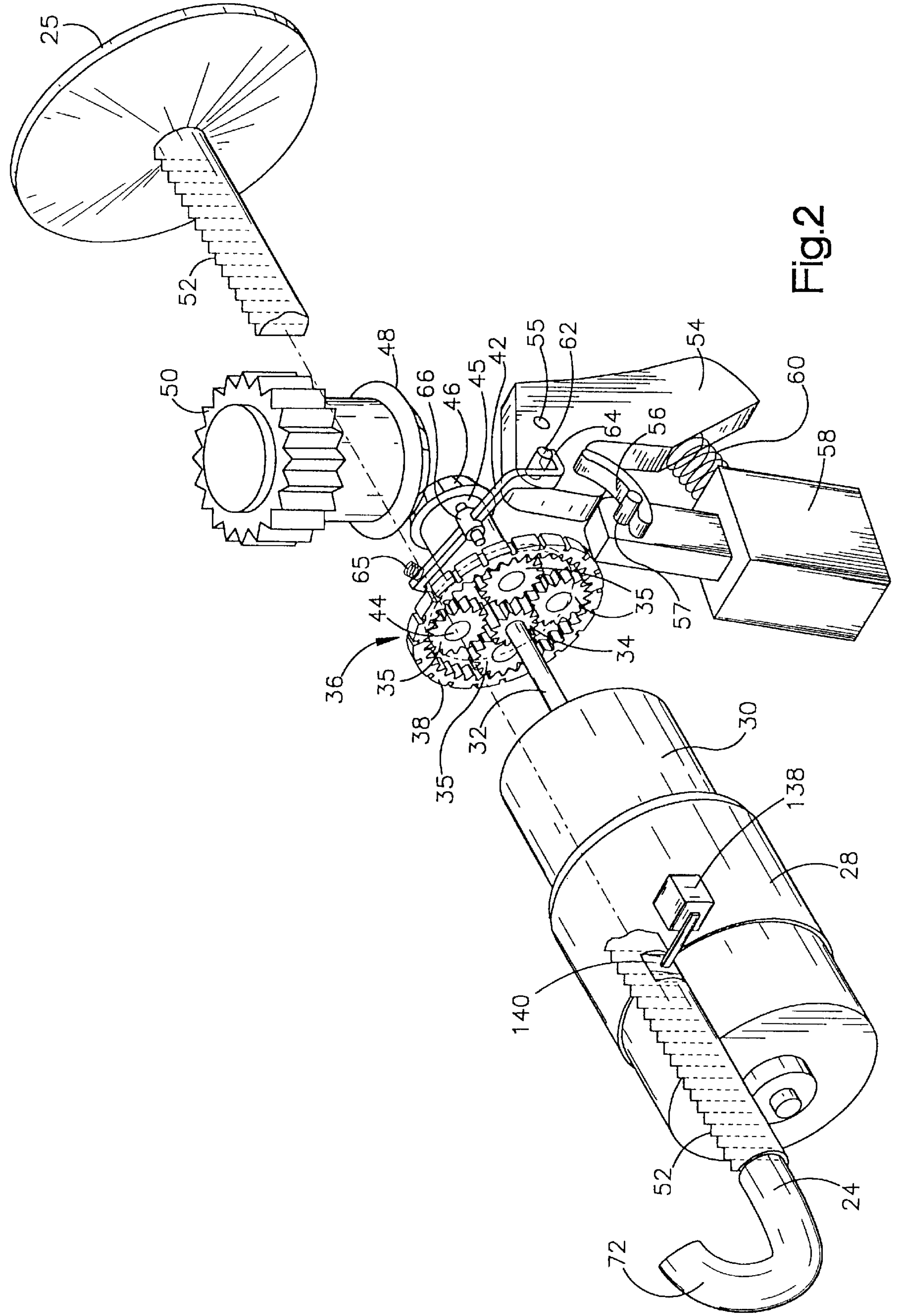
FIG. 2 is a perspective view of the motor, the rack and the drive train interposed between the two.
Figure 3:
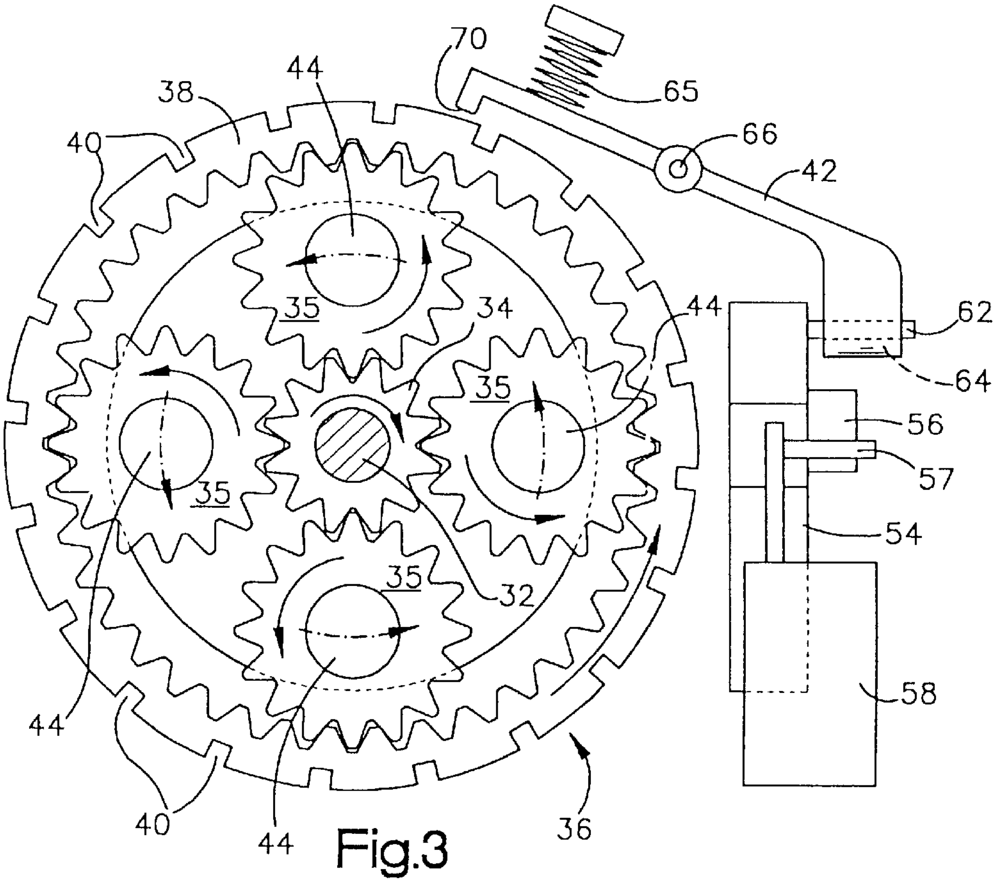
FIG. 3 is an enlarged sectional view showing the planetary in its normal condition.
Figure 4:
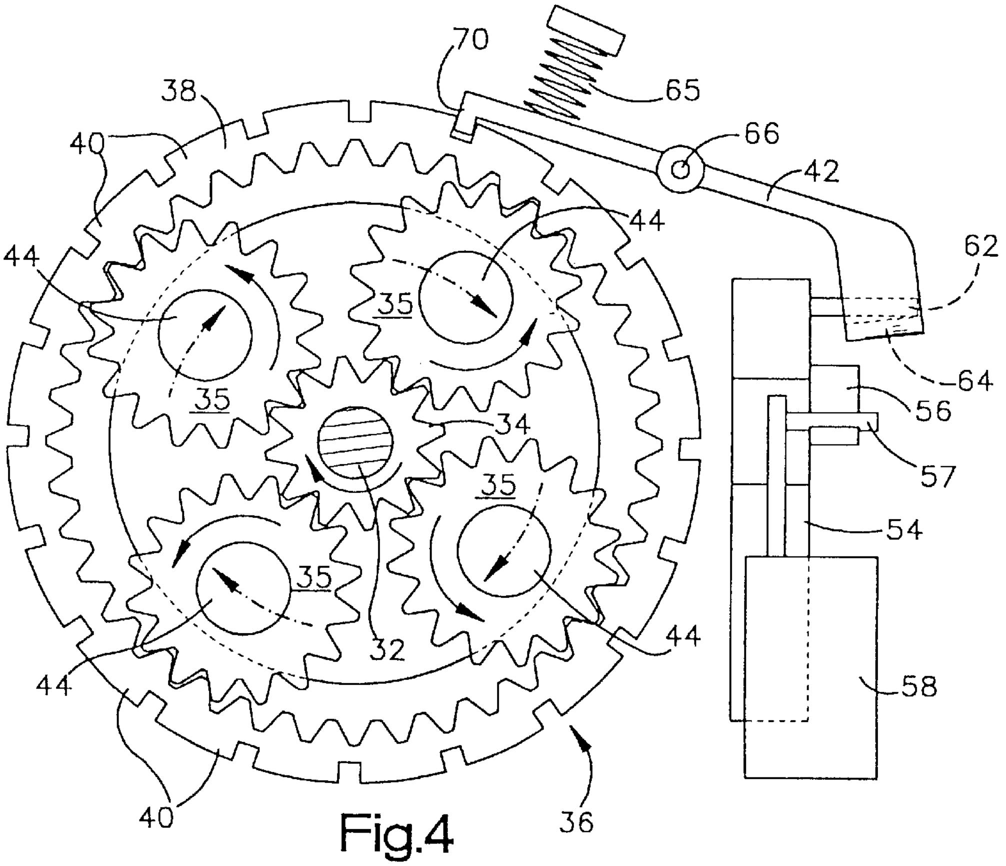
FIG. 4 is a view corresponding to FIG. 3 but showing the pawl engaged with a notch of the ring gear to place the planetary in a rack driving position.

In the embodiment of FIGS. 2–4, a pawl arm 62 projects laterally from the trigger 54. The pawl arm 62 engages a pawl projection 64. A spring 65 biases the pawl 42 about a pivot support 66 to maintain the pawl projection 64 in engagement with the pawl arm 62 when the trigger 54 is in its off position and to maintain the pawl in engagement with the ring gear when the trigger is depressed. The trigger spring 60 is stronger than the pawl spring 65, so that when the trigger is in its normal or off position, the pawl is biased to its normal position shown in FIG. 3.

The High Force Embodiment

Figure 5:
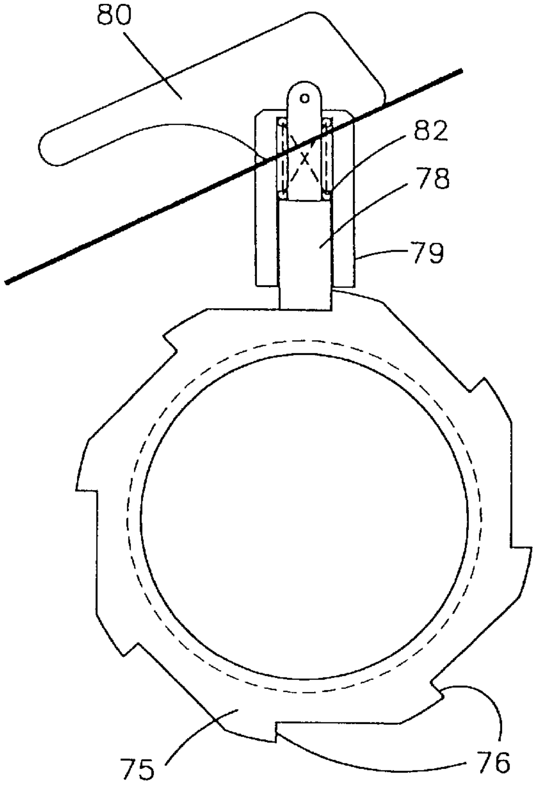
FIGS. 5 and 6 are partially sectioned elevational views of the enhanced strength force transmission control.
Figure 6:
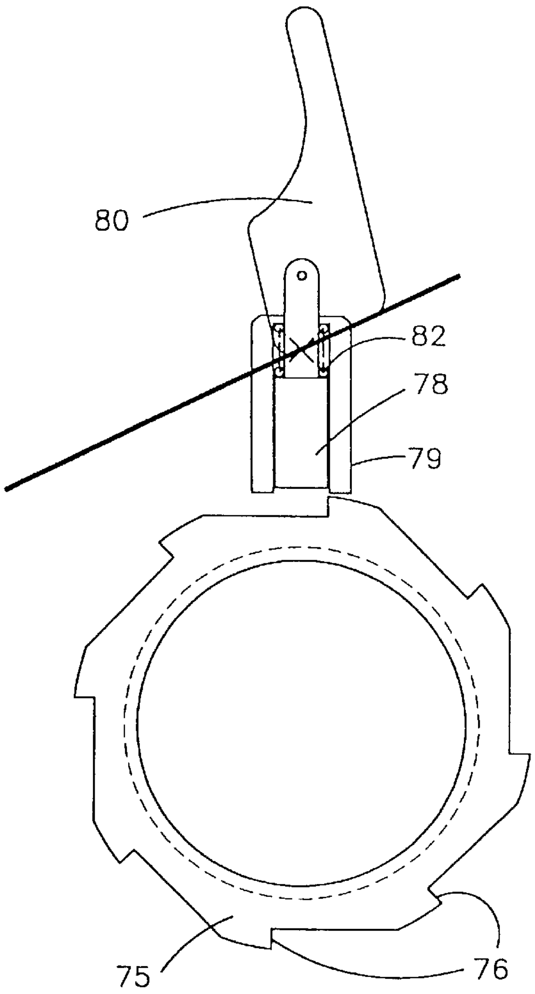

An enhanced strength force transmission control is shown in FIGS. 5 and 6. The enhanced control includes a modified ring gear 75 having a plurality of circumferentially spaced drive shoulders 76 formed in its perimetral surface. A plunger 78 is reciprocatably mounted in a cylindrical housing 79 secured in fixed relation to the remainder of the gun 10. A manually positionable over center lever 80 is pivotally connected to the plunger 78. A spring 82 biases the plunger toward the ring gear 75. The lever 80 has a ring gear release position as shown in FIG. 6. When the lever 80 is in the ring gear release position the spring 82 is compressed and the plunger is recessed in the housing out of engagement with the ring gear 75.

When the lever 80 is moved to its drive position as shown in FIG. 5, the spring 82 biases the plunger into circumferential engagement with the ring gear 75. As the ring gear rotates in a counterclockwise direction as viewed in FIG. 5, the plunger will drop into a notch adjacent one of the drive shoulders 76 which functions as a ring gear rotation arresting stop. Once it comes into engagement with the one drive shoulder, rotation of the ring gear is arrested. Any further operation of the motor will then drive the rod 24, through coaction of the pinion and the rack teeth 50, 52, to dispense material. Thus the plunger when in the drive position of FIG. 5 enables the drive train to function while when it is in its release position of FIG. 6 the drive train is disabled.

When the plunger 78 is in its disengaged position of FIG. 6, the rack 24 can be moved easily by grasping handle portion 72 and pushing or pulling the rod. When the lever 80 is moved to its position of FIG. 5, the spring biased plunger 78 will engage one of the shoulders 76 as shown in FIG. 5, such that further rotation of the ring gear 75 is prevented.

Figure 7:
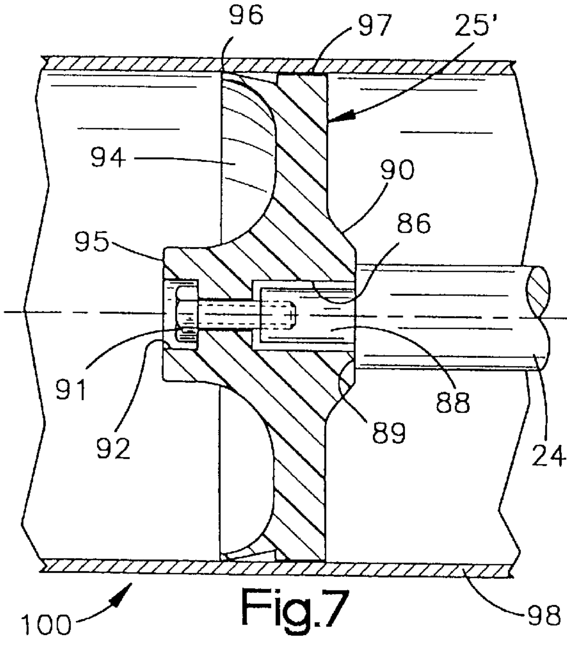
FIG. 7 is an enlarged sectional view of a piston.
Figure 7A:
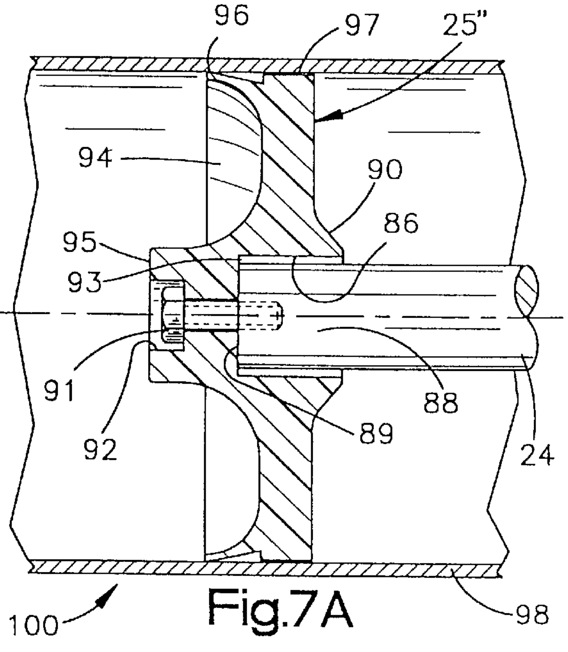
FIG. 7*a* is an enlarged sectional view of a piston showing a rod of uniform cross-sectional diameter; and, FIG. 8 is a sectional view of the five stage planetary.

Referring now to FIGS. 7 and 7*a*, enlarged cross sectional views of the pistons 25', 25" and their connections to the rod 24 are shown. For convenience where the features of the two pistons are the same, only the piston 25' of FIG. 7 will be referred to. The piston 25' is a unitary plastic component preferably formed of Delrin. The piston 25' has a counterbore 86 extending axially inwardly from a rearward or driven side of the piston. As pictured in FIG. 7, the rod 24 includes a reduced diameter end portion 88. More recent prototypes have not included a reduced diameter end portion on the rod as shown in FIG. 7*a* with either rod. The diameter of the rod 88 is less than the diameter of the counterbore 86 to provide a clearance which is shown in exaggerated form in FIG. 7. The rod 24 of FIG. 7 has an annular shoulder 89 surrounding the reduced diameter end portion 88 and abutting a rearwardly extending piston abutment 90 surrounding the counterbore 86. With the now preferred embodiment of FIG. 7*a* the end of the rod abuts the base of the counterbore at 93.

With both piston embodiments, a fastener in the form of a cap screw 91 is threaded into the end of the rod 24. The cap screw 91 has a head positioned in a piston face counterbore 92 which is axial aligned with the rod 24 and extends inwardly from the opposite or face side of the piston. The shank of the cap screw extends through an axial aligned bore connecting the two counterbores 86, 92. Radial clearance is provided between the piston on the one hand and the piston rod and cap screw on the other to permit limited relative movement to allow relative radial movement and maintenance of concentricity with the cartridge support section or barrel 12.

An annular, concave recess 94 is formed in the forward or face surface of the piston 25'. The annular recess surrounds a forwardly projecting central nose portion 95 of the piston 25'. The recess in turn is surrounded by an outwardly flaring, forwardly tapered, perimetral lip 96. The piston has an annular, perimetral skirt 97 adjacent its rear surface and spaced from the lip by a reduced diameter, central, perimetral surface. The lip 96 and the skirt 97 slidably engage a smooth internal wall of a surrounding tubular cartridge support section or barrel 98 which is interchanged with the support 12 for this application. The coaction of the outwardly flaring and deformable lip 96, together with the clearance between the piston and the rod and the cap screw, allows the piston to float somewhat relative to the piston rod. Because of this relative floating and the deformability of the lip 96, the piston is able to effectively act against a collapsible cartridge in the space 100. The cartridge is of the type used to house windshield repair adhesives.

The piston and rod construction as shown in FIG. 7 and more particularly in FIG. 7*a*, has a number of outstanding advantages. Indeed the piston rod construction is one of several features which, according to tests that have been conducted, enables the use of the dispenser of the present invention to dispense a newly developed, highly viscous two-part material used in the repair of automobile windshields and rear windows.

One of the outstanding features of the piston and rod assembly is that with the construction of FIG. 7*a* the force applied to the piston is ahead of a substantial portion of the face of the piston, notably the base of the annular recess 94, the resisting pressure of, for example an aluminum foil bag of the windshield repair adhesive, stabilizes the piston perpendicular to the piston axis, while with the embodiment of FIG. 7 that same force tends to tilt the piston into axial misalignment with the rod axis. The axial stabilization between the piston and rod achieved with the embodiment of FIG. 7*a* assists in causing the perimetral lip 96 to be uniformly deflected into sealing engagement with the barrel 98.

The lip itself is tapered forwardly in the direction of dispensing force to provide a flexible lip that is relatively easily forced into a tight sliding fit with a barrel. The coaction of the lip with the barrel causes, in the case of the windshield adhesive we have described, the aluminum casing to be neatly collected in the annular concave recess 94. The nose is configured to fully occupy an entrance to the nozzle 20 at the end of material dispensing from a given cartridge to displace as much material as possible from the cartridge to the object on which dispensed material is being applied.

Referring now to FIG. 8, the gearing 31 of the gear box 30 includes an elongate fixed ring gear 110 surrounding a three stage planetary. The output shaft 29 of the motor 28 is connected to a coaxial sun gear 112. The sun gear 112 drives planetary gears 114 of a first stage of the planetary. The planet gears 114 in turn drive a carrier 115 which includes a second stage sun gear section 116 of the speed reducing gearing 31. The sun gear 116 in turn drives planetary gears 118 which in turn drive a second stage carrier 120. The sun gear section of the second carrier 120 in turn drives planet gears 124. The planet gears 124 drive a third stage carrier 125 having a sun gear portion 126.

In the embodiment of FIG. 5, the planetary 36' having a selective output includes two stages within the ring gear 75. Thus, there are a total of five stages which are axially aligned and compactly designed to provide a gear reduction package which enables the battery operated motor 28 to drive a system which produces in excess of 2,000 pounds dispensing force.

The third stage carrier sun gear portion 126 drives a set of forth stage planet gears 128. The planet gears 128 in turn drive a fourth stage carrier 130 including a sun gear portion 132. The sun gear portion 132 in turn drives fifth stage planetary gears 134 which are carried by an output carrier 45'.

Red, yellow and green signal lamps 136 are provided, FIG. 1. The green lamp advises an observer that the motor is running for advance of the rod 24. The yellow lamp is illuminated when a double pole limit switch 138 senses a rod notch 140, FIG. 2. The notch is positioned for switch actuation to stop the motor when the rod has reached the limit of its dispensing advance. The red lamp is illuminated when an over load sensor (not shown) shuts the motor off.

Operation

When the gun 10 is to be used, the rod handle projection 72 is grasped by the operator and the rod 24 is pulled rearwardly until the pusher 26 engages the base of the cartridge support section 12. A cartridge 18 is inserted into the support section space and the rod is then pushed manually forward until the pusher engages the cartridge piston 26.

In the case of the heavy duty embodiment of FIGS. 5–8 employing the tubular cartridge support tube 98 the action is somewhat similar. The rod 24 is pushed manually to shift the piston 25' in a forward direction until engagement with the cartridge 100 is established. The manual advance followed by a power advance results in the piston aligning itself relative to the rod in a manner such that the lip 96 tightly engages the circumscribing wall of the tube 98.

On depression of the trigger 54 to move it from its normal to an on position, the control arm 57 of the switch 58 will move the switch to an on position. Once the switch is in an on position, a circuit is completed between a battery 68 and the motor 28 to energize the motor and cause it to rotate. Switch circuitry is so developed to linearly alter the supplied voltage to the motor, which resultingly controls the operational speed of the motor. Additionally, the switch incorporates a circuitry bypass at the full on position (full voltage) to preclude thermal buildup in the circuitry.

With the embodiment of FIGS. 1–4, as the motor rotates, the sun gear 34 will be driven in a clockwise direction as seen and indicated in FIG. 4. Rotation of the sun gear 34 causes the planet gears to rotate about their own axes in a counterclockwise direction as indicated by solid line arrows in FIG. 3. This rotation of the planet gears in turn causes the ring gear 38 to rotate in a counterclockwise direction as is also indicated in FIG. 3.

With the embodiment of FIGS. 2–4, when the trigger 54 is moved from its normal or off position to an on position, the pawl 42 will pivot about its axis 66 under the action of the pawl spring 65. This will cause a ring gear engaging projection 70 of the pawl 42 to engage the outer surface of the ring gear 38 and function as a clutch. Once one of the notches 40 in the ring gear is aligned with the projection 70, the pawl spring 65 will bias the projection into the aligned notch 40 as shown in FIG. 4.

The pawl to notch engagement stops ring gear rotation causing the planet gears to commence to orbit in a clockwise direction as indicated by the dotted arrows in FIG. 4. This planet gear orbiting in turn causes the carrier 45 to rotate also in a clockwise direction as indicated by arrows in FIG. 4. Rotation of the carrier 45 acting through the bevel gears 46, 48 causes the rod pinion 50 to rotate. Rotation of the rod pinion 50 drives the rod 24. In the embodiment of FIG. 1, the rod 24 drives its pusher 25 axially of the cartridge support section and against the cartridge piston 26 to expel viscous material through the nozzle 20.

With the gun of the embodiment of FIGS. 5–8, the over center lever 80 is moved from the position of FIG. 6 to the position of FIG. 5. This results in the spring 82 biasing the plunger 78 against the circumference of the ring gear 75. On actuation of the trigger 54, the first three stages of the gear box 30 will continue their speed reducing rotations. The pinion portion 126 of the third stage will continue to cause rotation of the fourth stage planet gears 128 about their own axes the ring gear will be driven counterclockwise as viewed in FIGS. 5 and 6 until the plunger engages one of the shoulders 76 as illustrated in FIG. 5.

Once the plunger 78 has engaged a shoulder 76 the ring gear 75 is prevented from rotation, so that the fourth stage planet gears 128 are caused to orbit about the sun gear portion 126 of the third stage. Orbiting of the planet gears 128 in turn causes rotation of the carrier 130 such that its sun gear portion 132 causes orbiting of the fifth stage planet gears 134. The orbiting of the fifth stage planet gears in turn drives the output carrier 45'.

With the embodiment of FIGS. 5–8, the piston lip 96 works around the cartridge in the space 100. As indicated previously, successful tests on a proposed windshield adhesive, baglike, cartridge having an aluminum foil outer skin have been conducted. As the piston 25' is advanced, the foil is collected in the annular recess 95 and a pleating action is effected on the foil tube as the piston is advanced until complete expulsion of the adhesive from the cartridge is achieved.

With either embodiment, the rate of material dispensing is controlled by varying the amount of trigger movement from its normal position toward a full on position. Varying the trigger movement in turn varies the movement of the variable speed control switch.

With the embodiment of FIGS. 2–4, the angles of the engaging surfaces on pawl 70 and the notches are so designed that when a predetermined maximum allowable torque (or dispensing force) of an engaged notch is exceeded, the pawl will be cammed out overcoming the spring load of spring 65 and disengaging the drive train.

When actuating pressure on the trigger 54 is terminated, the spring 60 will bias the trigger and pawl to their normal positions, lifting the pawl projection 70 out of the engaged notch 40. Movement of the trigger to its normal position also returns the switch 58 to its off condition.

With the heavy duty version of FIGS. 5–8, a conventional reversing switch 84, FIG. 1, for reversing operation of the DC motor 28 is provided. In order to disengage the plunger 78 from an engaged drive shoulder 76 the motor 28 is momentarily operated in a reverse direction. The over center lever 80 is then moved from the FIG. 5 engaged position to the FIG. 6 disengaged position to pull the plunger into the housing 79 and allow the ring gear 75 to rotate freely.

When the on/off switch 58 is in its off condition, and in the FIGS. 5–8 embodiment the plunger is in its FIG. 6 position, the rod 24 can readily be manually shifted in either direction. To retract the rod 24 one simply grasps rod handle projection 72 and pulls the rod rearwardly. This causes the rod pinion to rotate oppositely so that the carrier 45 through coaction of the bevel gears 46, 48 is driven in a counterclockwise direction causing the planet gears to orbit in a counterclockwise direction as indicated by the phantom arrows in FIG. 3. At this juncture the ring gear freely rotates. Similarly, when dispensing pressure stops and the pawl 42 or the plunger 78, as the case may be, is disengaged from its coacting ring gear 38 or 75, pressure of entrapped air in the viscous material of the cartridge can expand pushing the pusher 25 and the connected rod rearwardly causing the same counterclockwise rotation as will manual retraction of the rod.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. An electrically operated viscous material dispenser comprising:

a) a housing including body and handle portions for housing a motor and a motor control;

b) the housing also including a material dispensing portion extending from the body and handle portions, the dispensing portion including a material receiving space;

c) an electric motor carried by the housing, the motor having an output shaft for rotation about a shaft axis;

d) a push rod reciprocatably mounted in the housing for extension into the space to apply a dispensing force to a material being dispensed, the rod being generally parallel to the output shaft and projecting rearwardly out of the housing in spaced relationship with the motor portion, the rod also including a set of rack teeth;

e) a plurality of axially aligned planetary stages in axial alignment with and operably connected to the shaft for rotation about said axis, one of the planetary stages being an output stage including a sun gear, a ring gear and a set of planetary gears interposed between and engaging the sun and ring gears;

f) the ring gear being concentrically disposed about and coaxial with the sun gear, the ring gear also including a peripheral surface having at least one element engaging part;

g) gearing interconnecting the planet gears with the rack teeth in push rod drivable relationship; and, h) a moveable element carried by the housing and selectively engageable with the part to prevent ring gear rotation and thereby cause orbiting of the planet gears about the sun gear.

2. The dispenser of claim 1 wherein there are at least three said planetary stages.

3. The dispenser of claim 1 wherein said element engaging part is formed in the ring gear of said one stage and said one stage is the stage furthest from the motor.

4. The dispenser of claim 1 wherein there are five stages.

5. The dispenser of claim 3 wherein said element engaging part is formed in the ring gear of the stage furthest from the motor.

6. The dispenser of claim 1 wherein said gearing includes a pair of orthogonally disposed and meshing bevel gears.

7. An electrically operated viscous material dispenser comprising:

a) a housing including a motor space and a handle portion housing a motor control;

b) the housing also including a material dispensing portion extending from the handle portion in a direction opposite the motor portion, the dispensing portion including a material receiving space;

c) an electric motor at least partially within the motor portion, the motor having an output shaft extending toward the space for rotation about a shaft axis;

d) a push rod reciprocatably mounted in the housing for extension into the space to apply a dispensing force to a material being dispensed, the rod being generally parallel to the output shaft and projecting rearwardly out of the housing in spaced relationship with the motor portion, the rod also including a set of rack teeth;

e) a multi-stage planetary drivingly connected to the shaft in axial alignment with the shaft, an output one of the stages including a sun gear rotatable about said axis, the output stage also including a ring gear and a set of planetary gears interposed between and engaging the sun and ring gears;

f) the ring gear being concentrically disposed about and coaxial with the sun gear, the ring gear also including a peripheral surface having at least one element engaging part;

g) gearing interconnecting the planet gears with the rack teeth in push rod drivable relationship; and, h) a moveable element carried by the housing and selectively engageable with the element engaging part to prevent ring gear rotation and thereby cause orbiting of the planet gears about the sun gear.

8. The dispenser of claim 7 wherein there are at least three planetary stages.

9. The dispenser of claim 8 wherein there are five planetary stages.

10. The dispenser of claim 7 wherein the moveable element is manually actuable.

11. The dispenser of claim 7 wherein said gearing includes a pair of orthogonally disposed and meshing bevel gears.

12. An electrically actuated viscous material dispenser comprising:

a) a body including a handle section and a viscous material section connected to and extending outwardly from the handle section;

b) a reciprocatable push rod carried by the handle section for force transmission to the material section;

c) an electric motor mounted in the handle section and including an output shaft;

d) a drive element rotatively mounted in the handle section and in positive drive mechanically interconnected relationship with the rod;

e) the drive element being rotatable in one direction to drive the rod toward the material section;

f) the drive element normally being freely rotatable in another direction opposite the one direction in response to retractive motion of the rod;

g) a power train including a planetary including a plurality of axially aligned stages in axial alignment with and connected to the output shaft for transmission of driving force on rotation of the output shaft in response to motor energization;

h) a drive transmission means for interconnecting the drive element and the power train and for the transmission of driving forces when so interconnected and when the output shaft is rotated in response to motor energization; and i) the drive transmission means being adapted automatically to terminate the interconnection of the drive element and the power train upon cessation of output shaft rotation to free the push rod for movement independent of the transmission means.

13. The dispenser of claim 12 wherein a trigger is carried by the handle section and an on/off switch is operably connected to the trigger and movable to a closed position to complete a motor energization circuit in response to movement of the trigger from its normal to its actuating position.

14. The dispenser of claim 13 wherein the switch is a variable speed control switch.

15. An electrically actuated viscous material dispensing gun comprising:

a) a handle section;

b) a viscous material section connected to the handle section;

c) an electric motor carried by the handle section;

d) a viscous material pressure supplying element adapted selectively to apply pressure to a quantity of viscous material carried by the material section;

e) a power transmission means including a planetary gear set having multiple axially aligned stages, the set also having a normal condition enabling free movement of the element between retracted and extended positions in response to manually applied forces and a drive condition disabling the free movement of the element; and f) power drive condition enabling means for selectively energizing the motor to cause the power transmission to drive the element to apply pressure to such material when the transmission means is in its drive condition.

16. The gun of claim 15 wherein the enabling means includes a manually controlled plunger.

17. An electrically actuated viscous material dispenser comprising:

a) a body including a handle section and a viscous material section connected to and extending outwardly from the handle section;

b) a reciprocatable push rod carried by the handle section for force transmission to the material section;

c) an electric motor mounted in the handle section and including an output shaft;

d) a drive element rotatively mounted in the handle section and in positive drive mechanically interconnected relationship with the rod;

e) the drive element being rotatable in one direction to drive the rod toward the material section;

f) a power train including a planetary gear set including a plurality of axially aligned stages connected to the output shaft for transmission of driving force on rotation of the output shaft in response to motor energization;

g) a drive transmission means for interconnecting the drive element and the power train and for the transmission of driving forces when so interconnected and when the output shaft is rotated in response to motor energization;

h) the drive transmission means including a plunger selectively manually positionable one at a time in a drive disabling position and a drive enabling position, the enabling position being for establishing such interconnection of the drive element and the power train; and, i) the drive element being freely rotatable in another direction opposite the one direction in response to retractive motion of the rod when the plunger is in its drive disabling position.

18. The dispenser of claim 17 wherein the plunger is connected to an overcenter lever for shifting the plunger between its positions.

19. The dispenser of claim 18 wherein the plunger is spring biased toward its enabling position.

20. An electrically operated viscous material dispenser comprising:

a) a housing including a motor space and a handle portion housing a motor control;

b) the housing also including a material dispensing portion extending from the handle portion in a direction opposite the motor portion, the dispensing portion including a material receiving space;

c) an electric motor at least partially within the motor portion, the motor having an output shaft extending toward the space for rotation about a shaft axis;

d) a push rod reciprocatably mounted in the housing for extension into the space to apply a dispensing force to a material being dispensed, the rod being generally parallel to the output shaft and projecting rearwardly out of the housing in spaced relationship with the motor portion, the rod also including a set of rack teeth;

e) a multiple stage planetary axially aligned with the output shaft;

f) the multiple stage planetary including:

i) a fixed ring gear;

ii) an input sun gear drivingly connected to the output shaft;

iii) each stage including a set of planet gears engaging the fixed ring gear and an output carrier drivingly connected to the planet gears of the same stage; and, iv) each carrier including a sun gear portion drivingly connected to a downstream set of planet gears;

g) a clutching planetary including an output one of said carrier portions engaging a further planet gear set and a rotatably mounted ring gear surrounding and engaging the further planet gear set;

h) the clutching planetary being axially aligned with the output shaft and the multi stage planetary;

i) the rotatably mounted ring gear including a peripheral element engagement part; and, j) a moveable element carried by the housing and selectively engageable with the part to prevent ring gear rotation and thereby cause orbiting of the planet gears about the sun gear.

21. The dispenser of claim 20 wherein the clutching planetary also has multiple stages and the rotatably mounted ring gear surrounds and engages each of the clutching planetary multiple stages.

22. An electrically actuated viscous material dispenser comprising:

a) a handle section;

b) a viscous material section connected to the handle section;

c) an electric motor carried by the handle section;

d) a viscous material pressure supplying element adapted selectively to apply pressure to a quantity of viscous material carried by the material section;

e) a power transmission means having a normal condition enabling free movement of the element between retracted and extended positions in response to manually applied forces and a drive condition disabling the free movement of the element;

f) power drive condition enabling means for selectively energizing the motor to cause the power transmission to drive the element to apply pressure to such material when the transmission means is in its drive condition;

g) said pressure supplying element comprising a push rod and a piston connected to the push rod; and, h) the piston comprising a unitary body of circular cross section including:

i) spaced face and back surfaces;

ii) an axial through bore extending between the surfaces;

iii) the bore including a spaced pair of counterbores, one of the counterbores extending from the back surface toward the face surface and the other from the face surface toward the back surface;

iv) the one counterbore being for receipt of an end of the push rod;

v) the back surface including a drive section circumscribing the bore and adapted to engage the push rod in force transmitting relationship;

vi) the face surface including a nose section surrounding said counterbore and an annular concave recess section surrounding the nose section;

vii) a perimetral surface extending axially from the face to the back surface; and, viii) the perimetral and face surfaces together defining a perimetral lip around the concave section, the lip being of tapering thickness tapering from its thickest part at a location nearest the back surface forwardly to a thin termination at a juncture of the face and perimetral surfaces.

23. The dispenser of claim 22 wherein the lip flares outwardly in a direction from said location toward said juncture.

24. The dispenser of claim 22 wherein the piston is a plastic piston.

25. The dispenser of claim 24 wherein the plastic is Delrin.

26. The dispenser of claim 22 wherein the drive section is the base of said one counterbore.

27. The dispenser of claim 26 wherein the drive section is forward of the base of the recess section in the direction of dispensing movement.

28. The dispenser of claim 22 wherein the drive section is forward of the base of the recess section in the direction of dispensing movement.

29. An electrically actuated viscous material dispenser comprising:

a) a body including a handle section and a viscous material section connected to and extending outwardly from the handle section.

b) a reciprocatable push rod carried by the handle section for force transmission to the material section;

c) an electric motor mounted in the handle section and including an output shaft;

d) a drive element rotatively mounted in the handle section and in positive drive mechanically interconnected relationship with the rod;

e) the drive element being rotatable in one direction to drive the rod toward the material section;

f) a power train connected to the output shaft for transmission of driving force on rotation of the output shaft in response to motor energization;

g) a drive transmission means for interconnecting the drive element and the power train and for the transmission of driving forces when so interconnected and when the output shaft is rotated in response to motor energization;

h) the drive transmission means including a plunger selectively manually positionable one at a time in a drive disabling position and a drive enabling position, the enabling position being for establishing such interconnection of the drive element and the power train;

i) the drive element being freely rotatable in another direction opposite the one direction in response to retractive motion of the rod when the plunger is in its drive disabling position; and, j) a piston connected to the push rod, the piston comprising a unitary body of circular cross section including:

i) spaced face and back surfaces;

ii) an axial through bore extending between the surfaces;

iii) the bore including a counterbore extending from the back surface toward the face surface;

iv) the counterbore receiving and surrounding an end of the push rod;

v) the back surface including a drive section circumscribing the bore and adapted to engage the push rod in force transmitting relationship;

vi) the face surface including a nose section surrounding said bore and an annular concave recess section surrounding the nose section;

vii) a perimetral surface extending axially from the face to the back surface; and, viii) the perimetral and face surfaces together defining a perimetral lip around the concave section, the lip being of tapering thickness tapering from its thickest part at a location nearest the back surface forwardly to a thin termination at a juncture of the face and perimetral surfaces.

30. The piston of claim 29 wherein the lip flares outwardly in a direction from said location toward said juncture.

31. For use in a viscous material dispenser, a piston and push rod combination;

a) the piston comprising a unitary body of circular cross section including:

i) spaced face and back surfaces;

ii) an axial through bore extending between the surfaces;

iii) the bore including a counterbore extending from the back surface toward the face surface;

iv) the face surface including a nose section surrounding said bore and an annular concave recess section surrounding the nose section;

vii) a perimetral surface extending axially from the face to the back surface; and, viii) the perimetral and face surfaces together defining a perimetral lip around the concave section, the lip being of tapering thickness tapering from its thickest part at a location nearest the back surface forwardly to a thin termination at a juncture of the face and perimetral surfaces;

b) the push rod including an end portion engaging the piston; and, c) a fastener connecting the piston to the push rod.

32. The piston of claim 31 wherein said counterbore has a base disposed in an imaginary plane between a base of the recess section and a portion of the face defined by the nose section.

33. For use in a viscous material dispenser, a piston comprising a unitary body of circular cross section including:

a) spaced face and back surfaces;

b) an axial through bore extending between the surfaces;

c) the bore including a counterbore extending from the back surface toward the face surface;

d) the back surface including an annular drive section circumscribing the bore and adapted to engage a push rod in force transmitting relationship;

e) the face surface including a nose section surrounding said bore and an annular concave recess section surrounding the nose section;

g) a perimetral surface extending axially from the face to the back surface; and, h) the perimetral and face surfaces together defining a perimetral lip around the concave recess section, the lip being of tapering thickness tapering from its thickest part at a location nearest the back surface forwardly to a thin termination at a juncture of the face and perimetral surfaces.

34. The piston of claim 33 wherein said drive section is the base of the counterbore disposed in an imaginary plane between a base of the recess section and a portion of the face defined by the nose section.

35. The piston of claim 33 wherein the lip flares outwardly in a direction from said location toward said juncture.

36. The piston of claim 33 wherein the piston is a plastic piston.

37. The piston of claim 36 wherein the plastic is Delrin.

* * * * *